(12) United States Patent
Gottfriedsen et al.

(10) Patent No.: US 9,417,118 B2
(45) Date of Patent: Aug. 16, 2016

(54) DEVICE FOR VIBRATION COMPENSATION OF THE WEIGHT SIGNAL OF A WEIGHING SENSOR

(75) Inventors: Jan Gottfriedsen, Waldfischbach-Burgalben (DE); Alexander Schulzki, Stelzenberg (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 484 days.

(21) Appl. No.: 12/644,348

(22) Filed: Dec. 22, 2009

(65) Prior Publication Data
US 2010/0161268 A1  Jun. 24, 2010

(30) Foreign Application Priority Data
Dec. 23, 2008  (DE) .................... 10 2008 062 972

(51) Int. Cl.
*G01G 23/01* (2006.01)
*G01G 23/10* (2006.01)

(52) U.S. Cl.
CPC ........................................ *G01G 23/10* (2013.01)

(58) Field of Classification Search
CPC ...................................................... G01G 23/10
USPC ........................................................... 702/101
See application file for complete search history.

(56) References Cited

U.S. PATENT DOCUMENTS

| | | | |
|---|---|---|---|
| 4,553,618 A | 11/1985 | Kusmenskji et al. | |
| 5,347,092 A | 9/1994 | Buchs et al. | |
| 5,586,068 A * | 12/1996 | Rakib | H03H 21/0012 708/319 |
| 5,706,352 A * | 1/1998 | Engebretson | H04R 25/70 381/312 |
| 6,013,879 A | 1/2000 | Nakamura et al. | |
| 6,332,028 B1 * | 12/2001 | Marash | H03H 21/0012 367/119 |
| 7,009,118 B2 * | 3/2006 | Pottebaum | G01G 19/12 177/136 |
| 7,767,915 B2 * | 8/2010 | Gottfriedsen | G01G 23/12 177/1 |

FOREIGN PATENT DOCUMENTS

| | | |
|---|---|---|
| EP | 0 622 617 A1 | 11/1994 |
| EP | 0 442 940 B1 | 2/1995 |

(Continued)

OTHER PUBLICATIONS

Douglas, "Introduction to Adaptive Filters" Digital Signal Processing Handbook (1999).*

(Continued)

*Primary Examiner* — Hyun Park
(74) *Attorney, Agent, or Firm* — The Culbertson Group, P.C.

(57) ABSTRACT

Device for vibration compensation of weighing sensor weight signals, with a weighing signal branch having an analog/digital converter unit to which a weighing sensor analog weighing signal is fed, and that generates a digital weighing signal that contains discrete sample values of the sampled analog weighing signal of the weighing sensor. At least one compensation signal branch has an analog/digital converter unit to which an acceleration sensor analog noise quantity is fed for detecting a specified acceleration noise quantity, and that generates a digital noise quantity signal containing discrete sample values of the acceleration sensor analog noise quantity signal. The digital noise quantity signal is fed to an adaptive digital filter unit. An addition unit sums the signal values of the digital weighing signal and the signal values (carrying a negative sign) for the digital noise quantity signals fed to it.

21 Claims, 2 Drawing Sheets

(56) References Cited

FOREIGN PATENT DOCUMENTS

| | | |
|---|---|---|
| EP | 0 656 530 A1 | 6/1995 |
| EP | 0 756 158 A2 | 1/1997 |
| JP | 7 167705 A | 7/1995 |
| JP | 08-110261 A | 4/1996 |
| JP | 08-136329 A | 5/1996 |
| WO | WO 2006/111131 A1 | 10/2006 |
| WO | WO 2006111131 A1 * | 10/2006 |

OTHER PUBLICATIONS

Lacanette, "A Basic Introduction to Filters-Active, Passive, and switched-Capacitor," National Semiconductor (1991).*

Mohamed et al., "Adaptive Kalman Filtering for INS/GPS." J. of Geodesy (1999).*

JPO, Grounds for Denial issued Oct. 14, 2011 in corresponding Japanese Patent Application No. 2009-274356 (10 pages).

Klauer et al., "Adaptive interference suppression in measurement systems using parametric spectral analysis", Signal Processing III: Theories and Applications, I.T. Young et al. (edts.), 1986, Elsevier Science Publishers B.V. (4 pages).

Pandit et al., "Improving Measurement Accuracy by Employing an Auxiliary Sensor", Proceedings of the 11th Triennial World Congress of the Instrumental Measurement Confederation (IMEKO), IMEKO XI, Houston, TX, Oct. 16-21, 1988 (7 pages).

Widrow et al., "Adaptive Noise Cancelling: Principles and Applications", Proceedings of the IEEE, Dec. 1975, vol. 63, No. 12 (26 pages).

W. Kenneth Jenkins, Andrew W. Hull, Jeffrey C. Strait, Bernard A. Schnaufer, Xiaohui Li, Advanced Concepts in Adaptive Signal Processing, 1996, pp. i-xiii and 1-13, Kluwer.

* cited by examiner

DEVICE FOR VIBRATION COMPENSATION OF THE WEIGHT SIGNAL OF A WEIGHING SENSOR

FIELD OF THE INVENTION

The invention relates to a device for vibration compensation of the weight signal from a weighing sensor as well as a weighing device with such a device for vibration compensation.

BACKGROUND

In order to keep the number of weighing processes per time interval as high as possible, in conventional weighing devices it is known to send the measurement signal through only a low-pass filter with a relatively high cutoff frequency. This produces the desired low settling time for the filtered measurement signal. If, in addition to the load to be detected, interference acceleration forces also act on the weighing sensor, for example, in the form of relatively high-frequency vibrations, then such interference on the measurement signal can be eliminated at the output of the weighing device by means of the low-pass filter.

There is also the possibility that not only relatively high-frequency, but also low-frequency interference acceleration forces act on the weighing sensor. Corresponding low-frequency interference acceleration forces can rarely be eliminated with a typical low-pass filter, because, in this case, the cutoff frequency of the low-pass filter must be selected so low that the settling time no longer lies in an acceptable range.

Therefore it is typical to include acceleration forces as a significant noise source in the weight measurement through suitable acceleration sensors and to compensate for these forces with suitable methods. The acceleration sensor signal is used here to correct the measurement signal still containing the noise quantity. Until now, in the case of such known weighing devices, acceleration sensors have been constructed structurally identical to the actual weighing sensors and also oriented identically in the immediate surroundings of the weighing sensors. Acceleration sensors are often loaded with the same preload as the weighing sensors, wherein, in the case of the weighing sensors, the preload can consist of, for example, a balance pan or the transport device of a weighing conveyor.

With these measures, for the acceleration sensor with respect to the (mechanical) interference signals, approximately the same dynamic behavior is achieved that the weighing sensor has with respect to the interference signals. In order also to take into account the actual load force acting on the weighing sensor, the amplification of the noise quantity signal is tracked as a function of the load force or the mass placed on the weighing sensor.

If the weighing sensor is no longer structurally identical to the acceleration sensor, then it is known to realize a fixed image filter that simulates the system behavior of the actual weighing sensor with analog signal processing. The system behavior is influenced by the dynamic behavior of the mechanical components of the weighing sensor. In addition to the system behavior caused by the mechanical components, in the case of certain weighing sensors, electromechanical components also influence the system behavior. For example, in the case of a weighing sensor according to the principle of electrodynamic force compensation, the position controller plays a decisive role. At this point it shall be noted that, in the present description, a weighing sensor is understood as any force transducer that can be used for the purpose of weighing an arbitrary product.

One problem in this state of the art is that the dynamic behavior of the weighing sensor depends on the applied mass, that is, on the load force, and therefore, in the case of changing mass or varying load force, the image filter is no longer optimally adjusted. For example, in the case of typical weighing sensors, the natural resonances of the weighing sensor decrease with increasing load force. One possible solution in this case would be to construct the weighing sensor to be large and stiff with correspondingly very high natural resonances. This, however, runs counter to the demand for smaller structural size and high measurement-related sensitivity, where this feature often plays a significant role.

SUMMARY OF THE INVENTION

The invention provides a device for vibration compensation of the weight signal of a weighing sensor that ensures high measurement accuracy. Further, the invention allows such accuracy when using acceleration sensors that are not structurally identical to the actual load cell or the weighing sensor, and even when the load force acting on the weighing sensor covers a large range. In addition, the invention realizes a weighing device with such a device for vibration compensation.

The invention provides that, through the use of an adaptive digital filter in the signal path for determining the noise quantity, the frequency response of the digital filter can be adapted as a function of the output signal of the weighing device or of the device for vibration compensation, the entire frequency response of the compensation signal branch (including the acceleration sensor) for the relevant noise quantity (purely translational acceleration in a defined direction or purely rotational angular acceleration about a defined axis) to the frequency response of the components located in the weighing signal branch, in particular, the load-force-dependent frequency response of the weighing sensor being used (with reference to the same noise quantity). Thus, through suitable digital signal processing, i.e., the acceleration in a specified translation direction or the angular acceleration about a specified axis can be determined and subtracted from the measurement signal still containing this noise quantity.

In this way, by means of each compensation signal branch, the effect of an interference acceleration force can be taken into account, each with a defined degree of freedom, by generating a corresponding noise quantity signal. The possibly multiple noise quantity signals are then subtracted from the still distorted measurement signal. In each of the individual compensation signal branches, through the corresponding tracking of the frequency response of the weighing signal branch with reference to the respective noise quantity, the noise quantity dependent on the total load acting on the weighing sensor can be correctly determined and taken into account.

According to one embodiment of the invention, the adaptive filter unit may consist of the actual digital filter that has a specified number of filter parameters, as well as of a filter parameter determination unit to which the control variable is fed and that determines, as a function of the control signal fed to it, the filter parameters of the filter unit, which are then fed to the digital filter. Here, the control variable could be the output signal of the addition unit with which the measurement signal, which still contains a noise quantity, and the possibly multiple compensation signals of the compensation signal branches, which each carry a negative sign, can be summed.

Instead of the direct use of this summed signal, the output signal of the addition unit filtered with a low-pass filter could also be used. Finally, it is also possible to use the digital measurement signal, which still contains a noise quantity, as a control signal.

The filter parameter determination unit here can calculate the filter parameters from one or more functional analytical dependencies from the control signal.

According to another embodiment of the invention, the filter parameter determination unit can determine the filter parameters from one or more stored tables in which the filter parameters are stored as parameter sets as a function of values for the control signal or as a function of value ranges for the control signal.

In each case, determination of the filter parameters can be realized as a function of the control variable and the feeding of the determined filter parameters to the digital filter (and thus the entire process of the vibration compensation) as a closed control loop.

For simplifying the design of the entire filter, the digital filter may be divided into at least one first digital sub-filter whose filter parameters are determined adaptively as a function of the control variable and into at least one second digital sub-filter whose filter parameters can be kept constant, independently of the control variable. In this way, by means of the second digital sub-filter in a compensation signal branch, the portion of the frequency response of the weighing signal branch that is independent of the load force acting on the weighing sensor can be taken into account. Obviously, such portion also includes that portion of the frequency response of the weighing signal branch that is completely independent of an acceleration noise quantity acting on the weighing sensor. Here, it can involve, for example, the frequency response of electronic components, for example, digital or analog filters.

The filter parameters of the one or more second digital sub-filters can be determined in a calibration process dependent on the characteristics of the weighing branch that are independent of the load force acting on the weighing sensor. The determination can be performed using a higher-level control unit or also by means of the filter parameter determination unit that can be changed, for this purpose, to a calibration mode.

If several noise quantities are determined, for example, for different degrees of freedom of acceleration, then the one or more second digital sub-filters can be constructed identically in the different compensation signal branches, that is, they can have an identical filter structure and operate with the same filter parameters.

In this case, the structure of the entire compensation device may also then be selected so that the compensation branches have a common sub-branch in which lies a second digital filter that tracks, for all of the compensation signal branches, the part of the frequency response of the weighing signal branch that is not dependent on the load force.

According to one embodiment of the invention, the digital filter and thus also each of the one or more first or second digital filters can be divided into several second-order filters or can each consist of a second-order filter. In this way, the design of the filter is simplified. For those second-order sub-filters that are formed as adaptive sub-filters, a simpler functional dependence of the filter parameters on the control variable is produced.

Each filter unit in a compensation signal branch can comprise, according to the invention, a digital amplifier unit that is formed as a digital multiplication unit. The digital amplifier unit of a compensation signal branch can be included by the first digital sub-filter. This is because it involves merely a constant multiplication factor before the filter function.

The amplifier factor of the digital amplifier unit can also be determined adaptively as a function of the control variable.

If only a single compensation branch is provided, then, according to the invention, the adaptive digital filter may also be provided in the weighing branch, wherein, in this case (analogous to the preceding description), the frequency response of the weighing branch including the weighing sensor is adapted to the frequency response of the compensation branch including the acceleration sensor.

Additional embodiments or variations of the invention may be found in the claims, detailed description, and drawings.

DETAILED DESCRIPTION OF PREFERRED EMBODIMENTS

Figure 1:
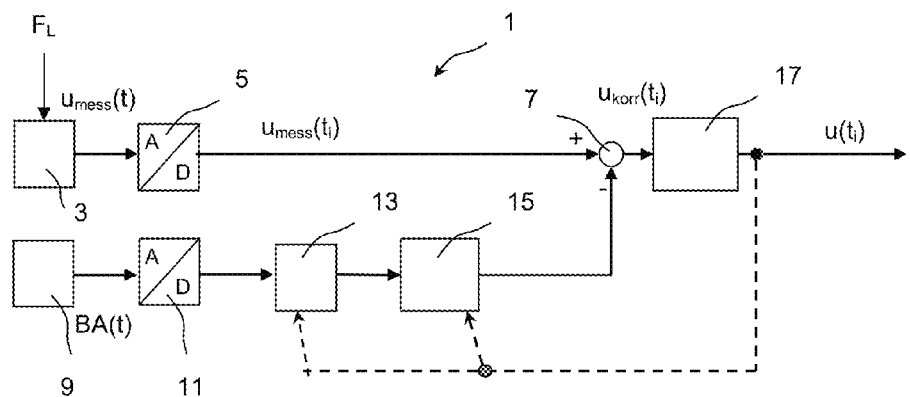
FIG. 1 is a schematic block diagram of the signal-processing components of a weighing device (that is not shown in more detail) in a first embodiment of a device for vibration compensation with a single noise quantity sensor.

FIG. 1 shows in a schematic block diagram of a weighing device 1, showing only the components relevant for the understanding of the present invention. The weighing device 1 comprises a weighing sensor 3 that is loaded with a load force $F_L$ from a mass $m_L$ to be weighed on a load transducer of the weighing sensor 3. The weighing sensor can function according to the principle of the electromagnetic force compensation or according to any other possible physical principle for detecting the weight of a mass $m_L$ to be weighed. Here, for the present invention, it is insignificant whether the weighing sensor 3 is formed as an individual load cell and, for example, integrated with an analog/digital converter unit 5 or whether the weighing sensor 3 exists as a separate, stand-alone unit.

The initially still analog measurement signal or weighing signal $u_{mess}(t)$ of the weighing sensor 3 is fed to the converter input of the analog/digital converter unit 5 that generates, at its output, a digital weighing signal $u_{mess}(t_i)$, wherein the digitized sample values of the digital measurement signal $u_{mess}(t_i)$ are designated $U_{mess,i}$. The digitized measurement signal is fed to an addition unit 7.

The weighing device 1 comprises, in addition, an acceleration sensor 9 for detecting an acceleration noise quantity in a specified translation direction or about a specified rotational axis. For example, the acceleration sensor 9 may respond to only acceleration forces that act in the direction of the introduction of the load force $F_L$ on the weighing sensor, that is, in the vertical direction. Such acceleration forces obviously also influence the analog measurement signal $u_{mess}(t)$ or the digitized signal $u_{mess}(t_i)$.

The analog output signal BA(t) of the acceleration sensor 9 is fed to another analog/digital converter unit 11 that samples the analog noise quantity signal BA(t) and converts it into a digitized signal $BA(t_i)$. The sampling time points of the two analog/digital converter units 5 or 11 are here preferably selected, insofar as possible, at the same time in order to avoid later compensation of a corresponding phase shift. In both cases, the sampling is performed at equidistant time segments.

The digitized output signal or the relevant sample values $BA(t_i)$ of the digitized noise quantity signal are initially fed to a digital amplifier unit 13, wherein this can be formed as a simple digital multiplication unit.

The digitized noise quantity amplified in this way is fed to a digital filter unit 15. The digital filter unit 15 can be realized as a standalone signal-processing unit or by a microcontroller unit that comprises corresponding filter software. The digital output signal of the filter unit 15 carries a negative sign and is fed as a correction signal or compensation signal to the addition unit 7. In this way, the relevant amplified value of the digital, filtered noise quantity signal $BA_i$ (i.e., multiplied with a specified factor) is subtracted from the digitized values $U_{mess,i}$ of the weighing signal $u_{mess}(t_i)$ still containing the noise quantity, so that the corrected or compensated weighing signal $u_{korr}(t_i)$ is at the output of the addition unit 7. This corrected digital signal $u_{korr}(t_i)$ is fed to a low-pass filter unit 17 that can be realized, for example, by forming a sliding average. The corrected and low-pass-filtered digital weighing signal $u(t_i)$ then lies at the output of the weighing device 1.

In order to generate a digital noise quantity signal that is correct in magnitude and phase and that is fed carrying a negative sign to the addition unit 7, it is necessary that the frequency response of the compensation signal branch (with respect to the relevant mechanical acceleration noise quantities) including the associated acceleration sensor is as identical as possible to the frequency response of the weighing signal branch including the weighing sensor (with respect to the same mechanical acceleration noise quantity) or approximates this response at least with a sufficient (specified) accuracy. The compensation signal branch here comprises the analog/digital converter unit 11, the digital amplifier unit 13, and the digital filter unit 15, while the weighing signal branch comprises the analog/digital converter unit 5.

If structurally identical sensors with identical properties are used for the weighing sensor 3 and the acceleration sensor 9, then the digital amplifier unit 13 and the digital filter unit 15 may be eliminated, as is known in the state of the art, at least when the same load force $F_L$ acts on both sensors. However, because this can rarely be realized, a correction of the detected measurement signal $u_{mess}(t)$ or $u_{mess}(t_i)$ must be performed just for this reason, because the frequency response of the weighing sensor 3 and thus the entire frequency response of the weighing signal branch including the weighing sensor regularly depends on the load force $F_L$.

If sensors that are not structurally identical are used for the weighing sensor 3 and the acceleration sensor 9, then, in the compensation branch, not only the influence of the different load forces on the frequency response of the weighing sensor, but also the different properties, i.e., in general, different frequency responses of the sensors and possibly of the electronic signal-processing components with different structures in the branches, must be compensated.

For the compensation of the load force-dependent change of the frequency response of the weighing sensor, the output signal $u(t_i)$ of the weighing device is fed to the digital filter unit 15 and, if necessary, also to the digital amplifier unit 13. In this way, the filter unit 15 or the digital amplifier unit 13 can each set the filter parameters or the amplification factor as a function of the output signal $u(t_i)$, so that, for the instantaneous load force $F_L$ acting on the weighing sensor 3, the frequency response of the weighing signal branch including the frequency response of the weighing sensor matches the frequency response of the compensation signal branch including the frequency response of the acceleration sensor (with respect to the specified acceleration noise quantity).

Here, as already explained above, the filter unit 15 can also take over the function of the digital amplifier unit 13. The digital filter unit 15 can be composed of the actual digital filter as well as a filter parameter determination unit to which the output signal $u(t_i)$ is fed as a control variable. The filter parameter determination unit can also determine the constant multiplication factor that realizes the digital amplifier unit 13.

For determining the filter parameters, the filter parameter determination unit can have available functional dependencies that each represents a filter parameter as a function of the control variable. Obviously, however, the filter parameters may also be determined from stored tables in which the filter parameters are stored as parameter sets as a function of values for the control variable or as a function of value ranges for the control variable. In general, the filter parameters can be determinal, empirically, for example, in a calibration mode of the filter unit or the filter parameter determination unit, and/or purely computationally (for example, through simulation).

Obviously, the non-low-pass-filtered output signal $u_{korr}(t_i)$ of the addition unit 7 or also the digital measurement signal $u_{mess}(t_i)$ still containing a noise quantity may also be fed to the digital filter unit 15 or the digital amplifier unit 13 instead of the output signal $u(t_i)$ of the weighing device 1.

Thus, through the use of an adaptive digital filter unit 15 and possibly additionally through the adaptive digital amplifier unit 13, the influence of frequency response changes may also be compensated by different load forces $F_L$ acting on the weighing sensor 3.

To achieve the most precise correction possible, the acceleration sensor 9 is positioned as closely as possible to the weighing sensor or is even integrated into the weighing sensor. If this cannot be ensured, then the fact that the acceleration noise quantity detected at the location of the acceleration sensor 9 may have a different value at the location of the weighing sensor should be taken into account in a corresponding positional dependence. This may also be taken into account in the filter unit 15 or the amplifier unit 13 in the calculation of the filter coefficients or in the calculation of the amplification factor.

Figure 2:
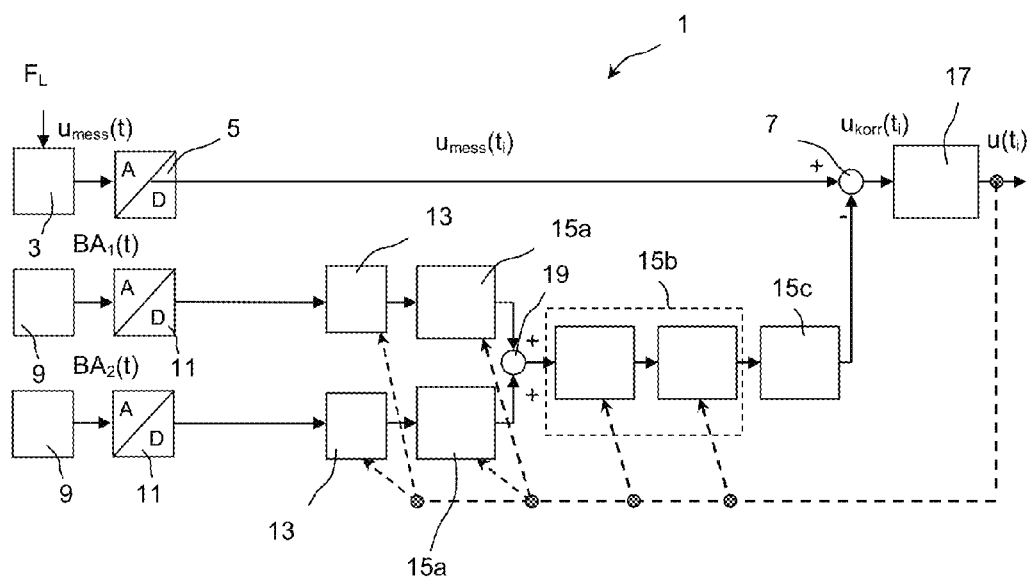
FIG. 2 is a diagram similar to FIG. 1 of another embodiment of a weighing device with a device for vibration compensation that has two noise quantity sensors.

While only a single acceleration noise quantity is corrected in the embodiment according to FIG. 1 (i.e., only the influence of a component of arbitrary acceleration forces in a defined translation direction or about an axis is corrected), FIG. 2 shows another embodiment of a weighing device 1 that comprises two acceleration sensors 9 for the correction of two equal or different acceleration variables. Here it should also initially be assumed that the acceleration sensors are arranged as closely as possible to the location of the weighing sensor, so that a correction of the positional dependence does not have to take place (as described, e.g., in DE 10 2005 018 708 B4 of the Applicant).

Of the acceleration sensors 9, for example, a first acceleration sensor may detect the acceleration in the load introduction direction of the load force $F_L$ acting on the weighing sensor, while the second acceleration sensor detects the angular acceleration about an axis that runs perpendicular to the load introduction direction and perpendicular to an axis of a load arm (for example, perpendicular to the plane in which lie the parallelogram control arms of a load cell that functions according to the principle of electromagnetic force compensation).

The embodiment according to FIG. 2 thus has two compensation signal branches, each of which comprises an analog/digital converter unit 11 to which the analog measurement signal or noise quantity signal $BA_1(t)$, $BA_2(t)$ of the acceleration sensors 9 is fed. Furthermore, each compensation signal branch comprises, in turn, a digital amplifier unit 13 to which the digitized noise quantity signals $BA_1(t_i)$ and $BA_2(t_i)$ of the relevant analog/digital converter unit is fed. The amplified digital noise quantity signals $BA_1(t_i)$ and $BA_2(t_i)$ are each fed to a digital filter unit 15a that is formed, in turn, adaptively. For this purpose, the digital output signal $u(t_i)$ of the device 1 is fed to each digital filter unit. Each digital filter unit 15a takes into account the different influences of the load force $F_L$ on the frequency response of the acceleration sensors 9 with respect to the different noise quantities. Then the adaptively filtered digital output signals of the digital filter units 15a are summed by means of an addition unit 19, and the summed digital signal is fed to another digital filter unit 15b that is also formed adaptively. Because the digital filter unit 15b is included due to the addition of each of the two compensation signal branches (instead of this, the filter unit 15b may be duplicated and each may be provided in each of the two branches before the summing point), it can be used for taking into account influences that occur in each of the two branches, for example, for taking into account a load dependence of the frequency response that is common to both acceleration sensors.

The output signal of the digital filter unit 15b is fed to another digital filter unit 15c that is formed as a simple non-adaptive filter unit. This is likewise allocated to each of the two compensation branches and can take into account influences that occur identically in each branch, for example, the adaptation of a non-load-dependent difference in the frequency response of the acceleration sensors 9 relative to the frequency response of the weighing sensor 3 or a frequency response difference present in both branches, with this difference being caused by additional electronic components (analog amplifier, etc.).

The digital correction signal determined in this way then carries, in turn, a negative sign and is added to the digitized measurement signal by means of the addition unit 7.

As already explained briefly above, the two compensation signal branches may obviously also be formed completely independently of each other and can each comprise an analog/digital converter unit 11, a digital amplifier unit 13, and digital filter units 15a, 15b, and 15c, wherein two separate compensation signals are then subtracted from the digital measurement signal $u_{mess}(t_i)$ at the summing point formed by the addition unit 7. However, this results in increased expense, since the additional summing point 19 carries much less weight than a doubling of the digital filter units 15b and 15c.

The adaptively constructed filter units 15a and 15b may each be formed as was explained above in connection with FIG. 1. However, a common filter parameter determination unit for the two filter units 15a lying in the still separated sub-branches of the compensation signal branches or a central filter parameter determination unit that determines the filter parameters for all of the adaptively formed digital filter units 15a and 15b may also be provided. Likewise, the digital amplifier unit 13 may also be integrated, in turn, in each of the sub-branches in the corresponding digital filter 15a and likewise may be structured adaptively.

The digital filter units 15a and 15b may be split (just like the digital filter unit in FIG. 1) into cascaded second-order sub-filter units. This provides the advantage of simpler dimensioning of the filter and simpler determination of the filter parameters. As is visible from FIG. 2, for example, the filter unit 15b may be constructed in the form of two cascaded second-order filter units. The filter unit 15a in the two sub-branches can obviously be realized similarly as one or more cascaded second-order filter units.

Each noise quantity signal (in a translational direction or about a rotational axis) may also be determined from the signals of two or more acceleration sensors, as is described, e.g., in DE 10 2005 018 708 B4 by the Applicant. For example, from the signals of two translational acceleration sensors that are arranged in a certain spacing, the angular acceleration can be determined about an axis that is perpendicular to the section connecting the two acceleration sensors.

Figure 3:
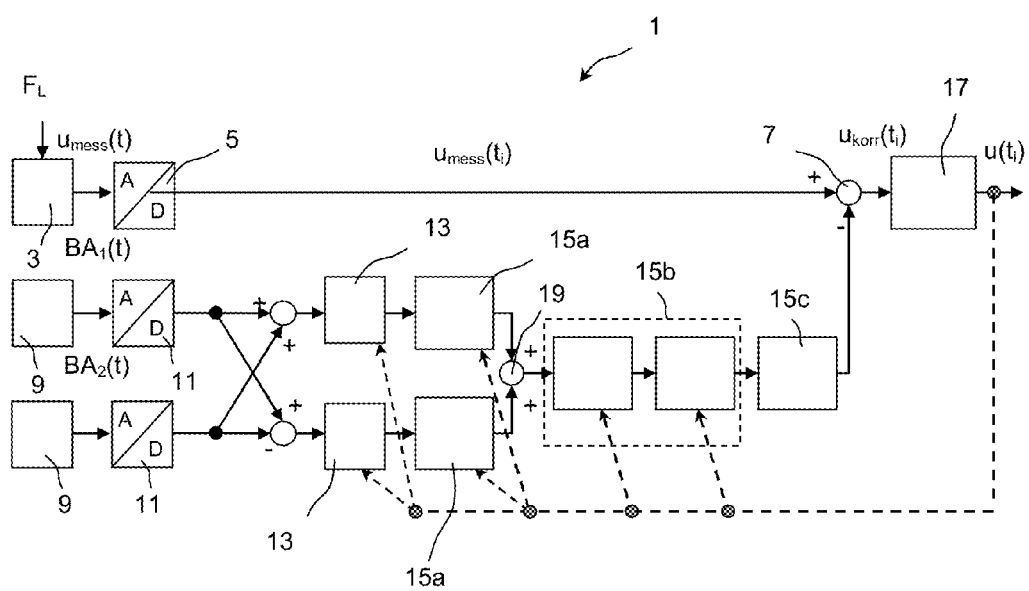
FIG. 3 is a diagram similar to FIG. 2 of another embodiment of a weighing device with a device for vibration compensation that has two noise quantity sensors whose signals are linked for calculating another noise quantity and/or for calculating the influence of each noise quantity at the location of the weighing sensor.

FIG. 3 shows another variant similar to FIG. 2, wherein the actual interference signals are each determined (with respect to a translation or rotational dimension) in the two sub-branches by linking the two digitized signals of the acceleration sensors 9. The acceleration sensor 9 in FIG. 3 can involve, for example, as described in DE 10 2005 018 708 B4 by the Applicant, two acceleration sensors that are arranged in a line with the weighing sensor 3 and that are set apart from this each by a specified distance. The acceleration sensors 9 can, in turn, be sensitive only with respect to acceleration forces that act in the direction of the load force $F_L$, that is, they include only those components of arbitrary acceleration forces that run in the vertical direction. Using the geometry data, by linking the digitized noise quantity signals $BA_1(t_i)$ and $BA_2(t_i)$, the pure translational acceleration acting at the location of the weighing sensor 3 can be determined in the direction of the load force $F_L$, and the rotational acceleration (angular acceleration) acting at the location of the weighing sensor 3 can be determined about an axis that is perpendicular to the load force and to the line connecting the sensors and that runs through the position of the weighing sensor 3.

Normally, for determining the digitized interference signals at the location of the weighing sensor, the digitized noise quantity signals $BA_1(t_i)$ or $BA_2(t_i)$ (translational acceleration at the location of the weighing sensor 3) must be summed weighted with specified factors, or the difference of the weighted noise quantity signals must be formed. Through the use of an adaptive filter unit 15a in the compensation branches, however, the weighting before corresponding addition units 19 and 7 can be eliminated. Instead, determination of the noise quantity signals acting at the location of the weighing sensor 3 may be performed through direct linking, for example, addition or subtraction of the actually detected and digitized noise quantity signals (without weighting with a corresponding factor taking into account positional dependence), wherein the positional dependence is taken into account by a corresponding setting of the filter parameters (including parameters of each digital amplifier unit in each compensation signal branch).

In the embodiment in FIG. 3 it is assumed that the acceleration sensors 9 are structurally identical or have sufficiently identical behavior with respect to the noise quantity to be detected. In this way, the compensation of different portions of the frequency response of the acceleration sensors 9 can be eliminated. For this purpose, if necessary, immediately after the digitization of the analog sensor signals, another, possibly adaptive, digital filter must be provided before the digitized sensor signals are linked.

As used herein, the terms "comprising," "including," "carrying," "having," "containing," "involving," and the like are to be understood to be open-ended, that is, to mean including but not limited to. Further, the description should be understood to support various sub-combinations of the features described, such as is apparent from the multiple dependent claims as presented in the foreign priority application.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A device for vibration compensation of a weight signal of a weighing sensor, the device comprising:
   (a) a weighing signal branch that comprises an analog/digital converter unit to which an analog weighing signal of the weighing sensor can be fed and that generates a digital weighing signal that includes discrete sample values of the sampled analog weighing signal of the weighing sensor;
   (b) at least one compensation signal branch including,
      (i) an analog/digital converter unit, to which an analog noise quantity signal of an acceleration sensor is fed for detecting an acceleration noise quantity in a specified translational direction or about a specified rotational axis, adapted to generate a digital noise quantity signal containing discrete sample values of the sampled analog noise quantity signal of the acceleration sensor, and
      (ii) a digital filter unit to which the digital noise quantity signal is fed, the digital filter unit formed as an adaptive digital filter unit;
   (c) an addition unit for summing the signal values of the digital weighing signal fed to it and the signal values of the noise quantity signals fed to it carrying a negative sign;
   (d) wherein an output signal of the addition unit or a filtered output signal of the addition unit or the digital weighing signal is fed to the filter unit as an output weighing control signal; and
   (e) wherein a frequency response of the filter unit is adapted as a function of the output weighing control signal dependent on the total load force acting on the weighing sensor, such that the frequency response of the relevant compensation signal branch including the relevant, associated acceleration sensor is adapted to match or approximate to, within a specified accuracy, the frequency response of the weighing signal branch including the weighing sensor relative to interference acceleration forces in the specified translation direction or about the specified rotational axis.

2. The device of claim 1, wherein the filter unit comprises a digital filter with a specified number of filter parameters and a filter parameter determination unit to which the output weighing control signal is fed and that is adapted to determine the filter parameters of the filter unit as a function of the output weighing control signal fed to it and to transmit these parameters to the digital filter.

3. The device of claim 2, wherein the filter parameter determination unit is adapted to calculate the filter parameters from one or more functional analytical dependencies from the output weighing control signal.

4. The device of claim 2, wherein the filter parameter determination unit is adapted to determine the filter parameters from one or more stored tables in which the filter parameters are stored as parameter sets as a function of values for the output weighing control signal or as a function of value ranges for the output weighing control signal.

5. The device of claim 2, wherein determination of the filter parameters is realized as a function of the output weighing control signal and the feeding of the determined filter parameters to the digital filter as a closed control loop.

6. The device of claim 2, wherein the digital filter is divided into at least one first digital sub-filter whose filter parameters are determined adaptively as a function of the output weighing control signal and into at least one second digital sub-filter whose filter parameters are constant, independent of the output weighing control signal.

7. The device of claim 6, wherein the filter parameters of the one or more second digital sub-filters in a calibration process are determined as a function of frequency response characteristics of the weighing branch that are independent of the load force acting on the weighing sensor and are fed to the one or more second digital sub-filters.

8. The device of claim 6, in which there are two or more compensation signal branches, and their respective first digital sub-filters are further divided into two sub-filters, a branch-specific adaptive sub-filter and a common adaptive sub-filter; and
   wherein:
      the second digital sub-filters of each branch are formed identically; and
      the common adaptive sub-filters of each branch are formed identically.

9. The device of claim 8, wherein the signal values of the digital output signals of the one or more first digital sub-filters of the two or more compensation signal branches are summed by an addition unit, and wherein the one or more second digital sub-filters of the two or more compensation signal branches are combined into at least one single second digital sub-filter to which the output signal of the addition unit is fed, so that the two or more compensation signal branches each comprise the relevant sub-branch up to the addition unit and the common part between the addition unit of the compensation signal branches and the addition unit for summing the signal values of the digital weighing signal and digital noise quantity signals.

10. The device of claim 6, wherein the one or more first digital sub-filters and/or the one or more second digital sub-filters are each formed as one or more second-order filters.

11. The device of claim 6, wherein the digital amplifier unit of a compensation signal branch is included by the first digital sub-filter.

12. The device of claim 6, in which there are two or more compensation signal branches, and their first digital sub-filters are further divided into two sub-filters, a branch-specific adaptive sub-filter and a common adaptive sub-filter; and
   wherein:
      (a) the signal values of the digital output signals of the branch-specific adaptive sub-filters of the two or more compensation signal branches are summed by an addition unit;
      (b) the common adaptive sub-filters of the two or more compensation signal branches are combined into a single common adaptive sub-filter to which the output signal of the addition unit is fed; and
      (c) the second digital sub-filters of the two or more compensation signal branches are combined into a single second digital sub-filter to which the output signal of the single common adaptive sub-filter is fed, so that the two or more compensation signal branches each comprise the relevant sub-branch up to the addition unit and the common part between the addition unit of the compensation signal branches and the addition unit for summing the signal values of the digital weighing signal and digital noise quantity signals.

13. The device of claim 2, wherein the filter unit comprises a digital amplifier unit that is constructed as a digital multiplication unit.

14. The device of claim 13, wherein the filter unit determines the amplification factor of the digital amplifier unit adaptively as a function of the output weighing control signal fed to it.

15. The device of claim 2, wherein the digital filter is divided into several second-order filters.

16. The device of claim 1, wherein the weighing device has at least one weighing sensor and at least one acceleration sensor, wherein the analog signals of each of these sensors are fed to corresponding analog/digital converter units of the weighing signal branch or the analog/digital converter unit of the at least one compensation signal branch.

17. A device for vibration compensation of a weight signal of a weighing sensor, the device comprising:
   (a) at least one compensation signal branch comprising an analog/digital converter unit, to which an analog noise quantity signal of an acceleration sensor is fed for detecting an acceleration noise quantity in a specified translational direction or about a specified rotational axis, adapted to generate a digital noise quantity signal containing discrete sample values of the sampled analog noise quantity signal of the acceleration sensor;
   (b) a weighing signal branch comprising:
      (i) an analog/digital converter unit to which an analog weighing signal of the weighing sensor can be fed and that generates a digital weighing signal that includes discrete sample values of the sampled analog weighing signal of the weighing sensor; and
      (ii) a digital filter unit to which the digital noise quantity signal is fed, the digital filter unit formed as an adaptive digital filter unit;
   (c) an addition unit for summing the signal values of the digital weighing signal fed to it and the signal values of the noise quantity signals fed to it carrying a negative sign;
   (d) wherein an output signal of the addition unit or a filtered output signal of the addition unit or the digital weighing signal is fed to the filter unit as an output weighing control signal; and
   (e) wherein the frequency response of the filter unit is adapted as a function of the output weighing control signal dependent on the total load force acting on the weighing sensor, such that the frequency response of the weighing signal branch including the acceleration sensor is adapted to match or approximate to, within a specified accuracy, the frequency response of the compensation signal branch relative to interference acceleration forces in the specified translation direction or about the specified rotational axis.

18. The device of claim 17, wherein the weighing device has at least one weighing sensor and at least one acceleration sensor, wherein the analog signals of each of these sensors are fed to corresponding analog/digital converter units of the weighing signal branch or the analog/digital converter unit of the one or more compensation signal branches.

19. The device of claim 17, wherein the filter unit comprises a digital filter with a specified number of filter parameters and a filter parameter determination unit to which the output weighing control signal is fed and that is adapted to determine the filter parameters of the filter unit as a function of the output weighing control signal fed to it and to transmit these parameters to the digital filter.

20. The device of claim 19, wherein the filter parameter determination unit is adapted to calculate the filter parameters from one or more functional analytical dependencies from the output weighing control signal.

21. The device of claim 19, wherein the filter parameter determination unit is adapted to determine the filter parameters from one or more stored tables in which the filter parameters are stored as parameter sets as a function of values for the output weighing control signal or as a function of value ranges for the output weighing control signal.

* * * * *